Patented Aug. 20, 1946

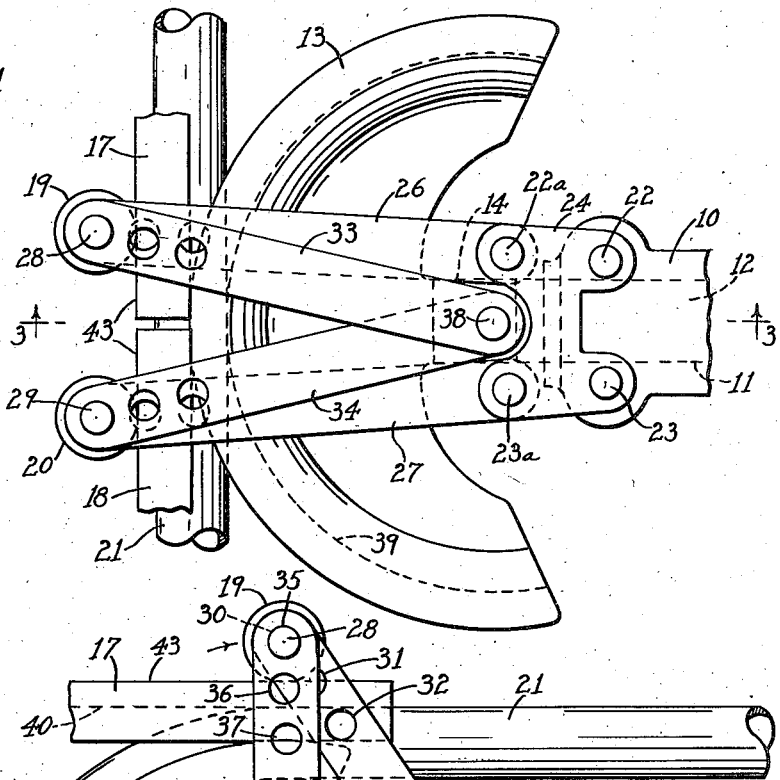
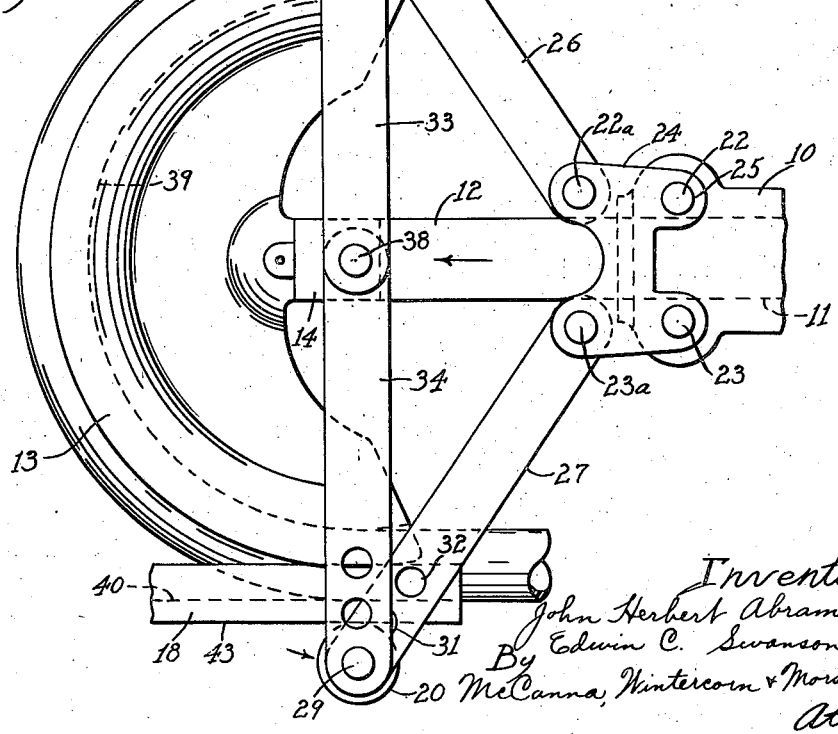

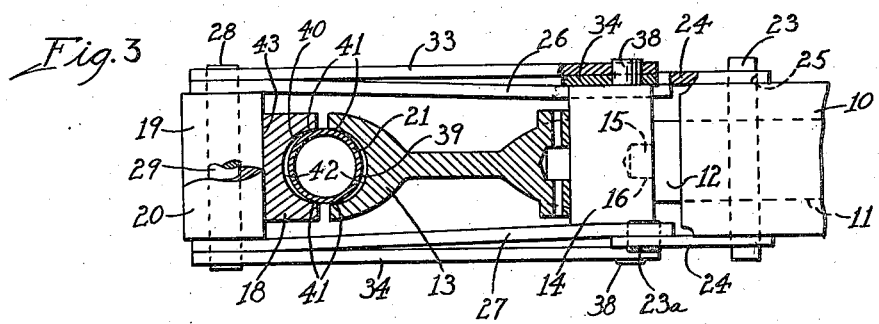
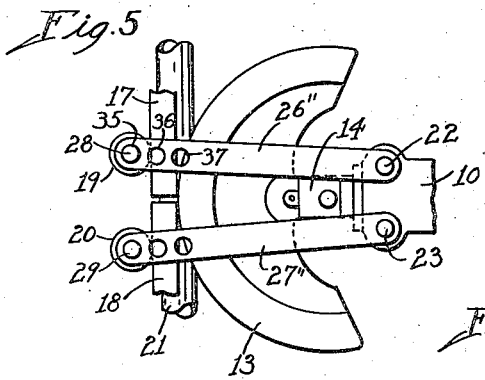
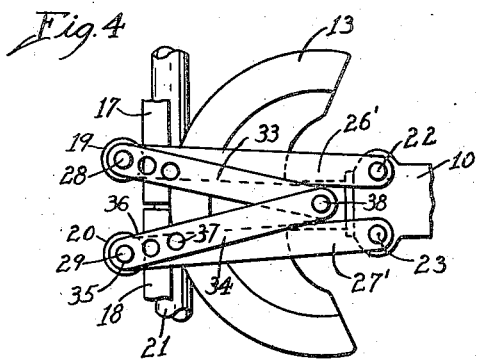
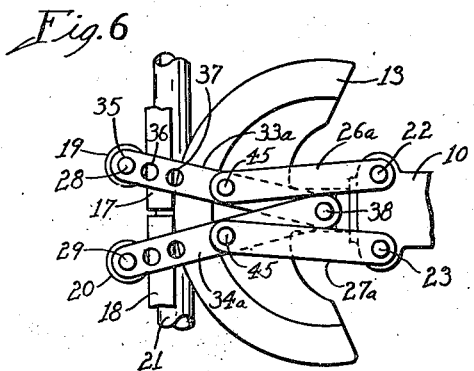

2,405,931

UNITED STATES PATENT OFFICE 2,405,931

CONDUIT BENDER

John Herbert Abramson and Edwin C. Swanson, Rockford, Ill., assignors to Greenlee Bros. & Co., Rockford, Ill., a corporation of Illinois Application April 26, 1943, Serial No. 484,560

12 Claims. (Cl. 153—45)

This invention relates to a new and improved portable hydraulic bending device especially designed and adapted for operating on conduit used in electrical wiring, but suitable for bending various kinds of thin walled metal tubes and pipes without danger of objectionable distortion or flattening thereof.

In our Patent 1,964,550, we disclosed a hydraulic bender in which the pipe or conduit to be bent was supported in the device at spaced points, and a shoe arranged to bear against the pipe so conduit between these points was given lineal movement to bend the pipe or conduit. It is the principal object of our present invention to provide a hydraulic bender of the same general type but having a larger substantially semi-circular shoe movable lineally, the peripheral groove in which is conformed to fit the inner side of the bend ultimately made in the conduit, a pair of rollers being provided, guided for arcuate movement away from one another with respect to the periphery of the lineally movable arcuate shoe and operatively interconnected with the shoe and the stationary body or frame, so as to be given movement in timed relation with the shoe and bend a piece of conduit interposed between the rollers and shoe to the curvature of the shoe to whatever included angle up to 180° may be desired.

Another object of the invention is to provide in a bender of the kind described an arcuate shoe having a peripheral groove slightly narrow in relation to the outside diameter of the pipe or conduit to be bent, the bender including straight auxiliary shoes to be interposed between the arcuate shoe and the rollers and provided with grooves of corresponding width, whereby any likelihood of serious distortion or flattening of the pipe or conduit in the bending thereof is avoided.

The rollers, in accordance with our invention, are of an ordinary cylindrical form and are adapted to roll on the flat backs of the auxiliary shoes, and in that way one set of rollers will serve for all purposes, a different arcuate shoe and different auxiliary shoes being provided for different outside diameters of pipe or conduit.

The linkage interconnecting the rollers with the arcuate shoe and stationary body or frame may, in accordance with our invention, be adjusted for different radii of bends, and in the preferred form of our device, we provide a pair of extension or adapter plates interposed between the stationary body or frame and the inner ends of the roller actuating links otherwise pivotally connected directly to the body or frame, whereby to permit pivotally connecting said links to the body at points spaced outwardly from the end of the body on opposite sides of the pivot point for the roller guiding links, because we have found that this makes for the easiest and smoothest operation throughout the range of bending.

The invention is illustrated in the accompanying drawings, in which—

Figs. 1 and 2 are face views of the bender of our invention with only a portion of the stationary body or frame shown, the device in Fig. 1 being illustrated at the beginning of a bending operation and in Fig. 2 at the end of a 180° bending operation;

Fig. 3 is a sectional view taken mainly on the line 3—3 of Fig. 1, with certain portions shown in side elevation to better illustrate the construction, and Figs. 4, 5, and 6 illustrate other devices similar to that of Figs. 1 to 3 but embodying different linkages.

Similar reference numerals are applied to corresponding parts throughout the views.

Referring first to Figs. 1 to 3, the reference numeral 10 designates the stationary body or frame of the device, in which is preferably provided a cylinder bore 11 for the piston 12. In our Patent 1,964,550, mentioned above, we disclose the complete, manually operable, hydraulic pump mechanism for injecting oil or other fluid under high pressure into the cylinder 11 behind the piston 12 by oscillatory movement of a hand lever, special provision being made to limit the outward movement of the piston at a predetermined point to prevent accidental displacement of the piston from the cylinder, as, for example, when the piston 12 reaches the extreme position shown in Fig. 2. In the patent there is also a disclosure of means operable to permit fluid to flow out of the cylinder so that the piston may be retracted and, of course, a similar provision is necessary in the present device, if the same is hydraulically operated. Inasmuch as the same operating means may be employed in the present device, or any other suitable or preferred means, whether of a hydraulic type or otherwise, it is not considered necessary to illustrate more than just relatively movable parts 10 and 12, in the manner shown. In other words, the part 12, although hereinafter referred to as a piston, should be considered in the broader sense as a ram movable relative to the stationary body or frame 10 in the operation of the bender, and the invention is not to be regarded as limited in any sense to whatever specific operating means may be employed for forcibly moving the ram with respect to the body or frame.

In accordance with the present invention, an arcuate shoe 13 is mounted on a crosshead 14 suitably attached to the outer end of the piston 12, as by engagement of a dowel pin projection 15 on the end of the piston in a socket 16 provided therefor in the crosshead, and this arcuate shoe cooperates with a pair of auxiliary straight shoes 17 and 18 and movable rollers 19 and 20 that are interconnected with the shoe 13 and body 10 so that arcuate movement is given the rollers in the lineal movement of the shoe to bend the conduit 21 interposed between the arcuate shoe 13 and the auxiliary shoes 17 and 18. The body 10 has a pair of pivot pins 22 and 23 mounted thereon in spaced parallel relationship on opposite sides of the piston 12, and although, as hereinafter disclosed, certain of the links connected to the rollers may be pivoted to the body directly on these pins, we have shown in Figs. 1, 2, and 3 extension or adapter plates 24 mounted on the body by engagement of the pins 22 and 23 in holes 25 in the plates. The adapter plates have auxiliary pivot pins 22a and 23a provided thereon in outwardly spaced parallel relation to the pins 22 and 23, respectively, and on opposite sides of the piston 12, as shown, for pivotal connection of tension links 26 and 27 with the body 10 through the medium of the adapter plates 24. Pivot pins 28 and 29 extend through holes 30 in the outer ends of the links 26 and 27 for rotary support of the rollers 19 and 20. Other holes 31 and 32 are provided in these links in inwardly longitudinally spaced relation to the holes 30 to permit setting the rollers 19 and 20 farther inwardly, as, for example, where bends on shorter radii are to be made. In a similar manner, links or arms 33 and 34, which are shown pivotally connected with the pins 28 and 29 by engagement of the pins in holes 35 in the outer ends of the links, have other holes 36 and 37 provided therein for other set-ups when smaller radius bends are to be made. The links 33 and 34 are pivotally connected at their inner ends with the shoe 13 through the medium of the crosshead 14 and the trunnions 38. While we have not shown any nuts or cotter pins, or other retaining means, on any of the pivot pins or trunnions, it will, of course, be understood that they may be provided, and usually are.

A half-round groove 39 is provided in the periphery of the shoe 13, and corresponding half-round grooves 40 are provided in the inner sides of the auxiliary shoes 17 and 18. These grooves 39 and 40 are of approximately the same diameter as the outside diameter of the pipe or conduit to be bent, but are preferably slightly narrower than the pipe or conduit, so as to have tight engagement on the diametrically opposite sides of the pipe or conduit, as indicated at 41 in Fig. 3, and ample working clearance at all points therebetween, as indicated at 42 in the same figure. In that way the pipe or conduit being bent is confined on the sides by the cooperating shoes 13, 17, and 18 as between dies and there is no danger of any excessive distortion or flattening. This is particularly important in thinner walled tubes, and it must be remembered that for the duration all conduit available generally is unusually thin walled.

The rollers 19 and 20 are of cylindrical form and are adapted to run on flat track surfaces 43 provided on the backs of the auxiliary shoes 17 and 18. In that way the same rollers serve for all purposes, different shoes being used for different diameters of pipe or conduit to be bent. Differences in the radius of bending are accommodated by the provision of the longitudinally spaced holes 30, 31, and 32 in the links 26 and 27 and cooperating longitudinally spaced holes 35, 36, and 37 in the links 33 and 34. The set-up illustrated in Figs. 1, 2, and 3 is for the largest radius bending.

In operation, the pipe or conduit to be bent is placed between the arcuate shoe 13 and the auxiliary straight shoes 17 and 18, as indicated at 21 in Fig. 1, and then lineal movement is given the shoe 13 and at the same time the rollers 19 and 20 are given arcuate movement in opposite directions in timed relation with the shoe 13, by reason of their interconnection with the shoe 13 and the stationary body or frame 10. The rollers maintain the same space relationship to the periphery of the arcuate shoe 13 throughout their movement thereby causing the auxiliary shoes 17 and 18 to bend the pipe or conduit to the same curvature as the shoe 13. The operator may, of course, stop the bending operation at any intermediate point and check the included angle, so as not to bend the pipe or conduit too far. Any bend up to 180°, and even beyond, is possible with the present device, and it should be apparent that the bend for any angle will be on a uniform radius, due to the fact that the shoe 13 selected for a specific bend fits the inner curvature of the ultimate bend and the rollers 19 and 20 in each set-up are set to be guided to follow the curvature of the arcuate shoe selected. A number of shoes 13 of different radii and having different width grooves 39 will be provided with each bender to accommodate a given range of operation, and a number of pairs of auxiliary shoes 17 and 18 having different width grooves will also be provided.

The bender shown in Fig. 4 is similar to that of Figs. 1 to 3, but has links 26' and 27' directly connected to the stationary body or frame 10 by means of the pivot pins 22 and 23, the adapter plates 24 being omitted. The device of Fig. 4 is otherwise like that of Figs. 1, 2, and 3, and the operation is substantially the same.

In Fig. 5 a device is shown in which the links 26'' and 27'' are the only ones used for causing the rollers 19 and 20 to operate the auxiliary shoes 17 and 18 in the lineal movement of the arcuate shoe 13 so as to bend the pipe or conduit 21 to the curvature of the shoe. Such a set-up may be made more quickly than that of Fig. 4 and will be satisfactory under certain conditions, as, for example, where only small angle bends are to be made, and in other cases where it is not as important to insure accurate guiding of the rollers 19 and 20 around the arc of the shoe 13 and in accurately timed relation with the movement of the shoe. Otherwise the operation is similar to that of Figs. 1 to 3 and Fig. 4.

The device shown in Fig. 6 is the same as that of Figs. 1 to 3 and Fig. 4 in so far as the stationary body or frame 10 and the relatively movable arcuate shoe 13 are concerned, and also in so far as the rollers 19 and 20 cooperating with the auxiliary shoes 17 and 18 are concerned. However, a different linkage is provided in this device. The links 26a and 27a for transmitting arcuate movement to the rollers 19 and 20 are shorter than the links 26 and 27 and are pivotally connected at one end to the stationary body or frame 10 and at the other end to the links 33a and 34a at points intermediate the ends thereof, as indicated at 45. The links 33a and 34a are otherwise like the links 33 and 34 of Figs. 1 to 3 and Fig. 4, being provided with longitudinally spaced holes 35, 36, and 37 in the outer end portions thereof for reception of the pins 28 and 29 in any one of three different positions of adjustment, depending upon the radius of the bend to be made and accordingly the radius of the shoe 13 selected. The operation of this bender is substantially the same as that of Figs. 1 to 3 or that of Fig. 4.

It is believed the foregoing description conveys a good understanding of the objects and advantages of our invention. The appended claims have been drawn to cover all legitimate modifications and adaptations.

We claim:

1. In a bending device, the combination of a pair of elements comprising a frame member and a driven member relatively movable lineally having suitable means for so moving the same, an arcuate shoe wholly carried on and movable lineally with the driven member relative to the frame member to bring the shoe into engagement with an object to be bent at a point intermediate the ends of the arc thereof to conform the object more or less to the curvature of said shoe, a pair of cooperating bending elements adapted to initially engage the opposite side of the object to be bent at spaced points on opposite sides of the point of initial engagement of the shoe with said object, means for guiding said bending elements to move in opposite directions from said spaced points in arcs substantially following the curvature of said shoe, and means for pivotally connecting said bending elements with the frame member to support the bending elements thereon whereby to cause arcuate movement of said bending elements in response to the lineal movement of the shoe.

2. In a bending device, the combination of a pair of elements relatively movable lineally having suitable means for so moving the same, an arcuate shoe movable lineally with one of said elements relative to the other and arranged to engage an object to be bent at a point intermediate the ends of the arc thereof to conform the object more or less to the curvature of said shoe, a pair of cooperating bending elements adapted to engage the opposite side of the object to be bent at spaced points on opposite sides of the point of initial engagement of the shoe with said object, arms pivoted on an axis movable with said shoe for oscillatory movement relative to the shoe on an axis substantially coincident with the center of the arc of said shoe and supporting said bending elements for arcuate movement substantially following the curvature of said shoe, and tension members interconnecting said arms with the other of said relatively movable elements whereby said arms are given oscillatory movement in response to the lineal movement of said shoe.

3. A bending device as set forth in claim 2, wherein the bending elements are adjustable to different positions on the outer ends of said arms to change the radius of operation thereof.

4. A bending device as set forth in claim 2, wherein the bending elements are adjustable to different positions on the outer ends of said arms to change the radius of operation thereof, and wherein the arcuate shoe is removable from the first of said relatively movable elements to permit substitution of another arcuate shoe of different radius.

5. In a bending device, the combination of a pair of elements relatively movable lineally having suitable means for so moving the same, an arcuate shoe movable lineally with one of said elements relative to the other and arranged to engage an object to be bent at a point intermediate the ends of the arc thereof to conform the object more or less to the curvature of said shoe, a pair of auxiliary shoes to engage the opposite side of the object, a pair of bending elements cooperating with said auxiliary shoes at spaced points on opposite sides of the point of initial engagement of the arcuate shoe with said object, arms pivoted for oscillatory movement relative to the arcuate shoe on an axis substantially coincident with the center of the arc of said shoe for supporting said bending elements and for arcuate movement thereof substantially following the curvature of said shoe, and tension links pivotally connected at one end to the other of said relatively movable elements for rotation on a fixed axis and at the other end to the arms to cause substantially equal oscillatory movement of the latter in response to the lineal movement of the arcuate shoe in compressing said object.

6. A bending device as set forth in claim 5, wherein the bending elements are adjustable on said arms to different positions in longitudinally spaced relation relative to the outer ends of said arms to change the radius of operation thereof, said device including an extension member adapted to be interposed between the links and the said other of the relatively movable elements for pivotal connection of said links on said element but at points closer to the arcuate shoe.

7. In a portable conduit or pipe bending device, the combination of a frame and a driven member movable lineally on the frame having suitable means for so moving the same, an arcuate shoe on said driven member movable lineally therewith arranged to engage a conduit to be bent at a point intermediate the ends of the arc of the shoe, said shoe having a peripheral groove to receive the conduit, a pair of substantially straight auxiliary shoes having grooves provided therein to engage the conduit from the opposite side relative to the arcuate shoe, a pair of rollers adapted to engage the outer sides of the auxiliary shoes at spaced points on opposite sides of the point of initial engagement of the arcuate shoe with said conduit to bend the conduit more or less to the curvature of the arcuate shoe, arms pivotally connected with said arcuate shoe for oscillatory movement relative thereto on an axis substantially coincident with the center of the arc of said arcuate shoe for supporting said rollers for substantially equal arcuate movement away from said spaced points substantially following the curvature of said shoe, and tension links interconnecting said arms with frame to impart oscillatory movement to said rollers in response to the lineal movement of said shoe.

8. A conduit bending device as set forth in claim 7, wherein the followers are adjustable to different positions in longitudinally spaced relation relative to the outer ends of said arms to change the radius of operation thereof.

9. In a portable conduit or pipe bending device, the combination of a frame and a driven member movable lineally on the frame having suitable means for so moving the same, an arcuate shoe on said driven member movable lineally therewith arranged to engage a conduit to be bent at a point intermediate the ends of the arc thereof, said shoe having a peripheral groove to receive the conduit, a pair of substantially straight auxiliary shoes having grooves provided therein to engage the conduit from the opposite side relative to the arcuate shoe, a pair of cylindrical rollers adapted to engage flat surfaces on the outer sides of the auxiliary shoes at spaced points on opposite sides of the point of initial engagement of the arcuate shoe with said object to bend the object more or less to the curvature of the arcuate shoe, arms disposed on opposite sides of said shoes having ends pivoted for movement with said arcuate shoe and for oscillatory movement relative to the shoe on an axis substantially coincident with the center of the arc of said shoe, the opposite ends of said arms rotatably supporting opposite ends of said rollers for arcuate movement substantially following the curvature of said shoe, and tension links on opposite sides of said shoes pivotally connected at one end to the frame for rotation on a fixed axis and at the other end to said arms to cause oscillatory movement of the latter in the lineal movement of the shoe in compressing the conduit.

10. In a conduit or pipe bending device, the combination of a pair of elements relatively movable lineally having suitable means for so moving the same, an arcuate shoe movable lineally with one of said elements relative to the other and arranged to engage a conduit to be bent at a point intermediate the ends of the arc thereof, said shoe having a peripheral groove to receive the conduit, a pair of substantially straight auxiliary shoes having grooves provided therein to engage the conduit from the opposite side relative to the arcuate shoe, a pair of cylindrical rollers adapted to engage flat surfaces on the outer sides of the auxiliary shoes at spaced points on opposite sides of the point of initial engagement of the arcuate shoe with said conduit to bend the conduit more or less to the curvature of the arcuate shoe, a pair of arms disposed on opposite sides of said arcuate shoe, the arms of each pair having one end pivotally connected together and the opposite ends pivotally connected to said rollers to support opposite ends thereof for arcuate movement substantially following the curvature of said shoe, said arms acting to cause the rollers to move away from said spaced points at the same rate, and links pivotally connected at one end to the other of said relatively movable elements for rotation on a fixed axis and at the other end to said rollers to impart arcuate movement to said rollers in response to lineal movement of the arcuate shoe.

11. The combination in a tube bending device of a frame member and a driven member movable with respect thereto, an arcuate bending shoe supported on said driven member movable lineally therewith into engagement with a tube to be bent intermediate the ends of the latter, a pair of substantially straight auxiliary bending shoes to engage the tube from the opposite side relative to said arcuate shoe, a pair of followers adapted to engage the outer sides of the auxiliary shoes at spaced points on opposite sides of the point of initial engagement of the arcuate shoe with the tube, a plurality of substantially straight links pivotally supported on one end on said frame member for supporting said followers on the frame member at said spaced points and produce a lateral component of force to move the followers away from each other and peripherally of the arcuate shoe in response to movement of said driven member with respect to the frame member in a direction to force the arcuate shoe against the tube in a bending stroke, and arms connected at one end to said followers and pivotally interconnected at their opposite ends to cause said followers to move away from said spaced points at substantially the same rate.

12. The combination in a tube bending device of a frame member comprising a fluid cylinder and a driven member comprising a piston disposed therein and movable lineally with respect thereto, an arcuate bending shoe on said piston projecting beyond the end thereof and movable lineally therewith into engagement with a tube to be bent at a point intermediate the ends of the arc of the shoe, a pair of loose substantially straight auxiliary bending shoes to engage the tube from the opposite side relative to said arcuate shoe, a pair of followers adapted to engage the outer sides of the auxiliary shoes at spaced points on opposite sides of the point of initial engagement of the arcuate shoe with the tube, a plurality of substantially straight tension links disposed on opposite sides of said shoes to support the same therebetween, said links being pivotally supported at one end on said frame member for pivotally supporting said followers on said frame member at said spaced points and thereby produce a lateral component of force to move the followers arcuately substantially following the curvature of the arcuate shoe in response to movement of said arcuate shoe against the tube in a bending stroke, and means interconnecting said followers for equalizing the lateral force applied thereto to cause the followers to move away from said spaced points at substantially the same rate.

JOHN HERBERT ABRAMSON.
EDWIN C. SWANSON.